(12) United States Patent
Groff (10) Patent No.: US 12,413,485 B2
(45) Date of Patent: Sep. 9, 2025

(54) SYSTEM AND METHOD TO GENERATE OPTIMIZED SPECTRUM ADMINISTRATION SERVICE (SAS) CONFIGURATION COMMANDS

(71) Applicant: DISH Wireless L.L.C., Englewood, CO (US)

(72) Inventor: Montgomery Nelson Groff, Denver, CO (US)

(73) Assignee: DISH Wireless L.L.C., Englewood, CO (US)

( * ) Notice: Subject to any disclaimer, the term of this patent is extended or adjusted under 35 U.S.C. 154(b) by 0 days.

(21) Appl. No.: 18/447,411

(22) Filed: Aug. 10, 2023

(65) Prior Publication Data

US 2025/0055768 A1 Feb. 13, 2025

(51) Int. Cl.
*H04L 41/40* (2022.01)
*H04L 41/16* (2022.01)
*H04W 24/02* (2009.01)

(52) U.S. Cl.
CPC ............. *H04L 41/40* (2022.05); *H04L 41/16* (2013.01); *H04W 24/02* (2013.01)

(58) Field of Classification Search
CPC ......... H04L 41/40; H04L 41/16; H04W 24/02
See application file for complete search history.

(56) References Cited

U.S. PATENT DOCUMENTS

| | | | |
|---|---|---|---|
| 7,920,472 B2 * | 4/2011 | Porat | H04L 47/762 370/398 |
| 10,177,998 B2 | 1/2019 | Parandehgheibi et al. | |
| 10,572,226 B2 | 2/2020 | Biskup et al. | |
| 10,756,949 B2 | 8/2020 | Kulshreshtha et al. | |
| 11,082,487 B1 | 8/2021 | Jain et al. | |
| 11,119,980 B2 | 9/2021 | Szczepanik et al. | |
| 11,157,629 B2 | 10/2021 | Shenoy et al. | |

(Continued)

OTHER PUBLICATIONS

Data Lakes, Databricks, retrieved Sep. 7, 2024 from <https://databricks.com/discover/data-lakes/introduction>, Evidenced by the Wayback machine Jul. 31, 2022, p. 1-4 (Year: 2022).*

(Continued)

*Primary Examiner* — Tonia L Dollinger
*Assistant Examiner* — Joseph M Cousins
(74) *Attorney, Agent, or Firm* — Baker Botts L.L.P.

(57) ABSTRACT

An apparatus comprises a memory and a processor communicatively coupled to one another. The memory may be configured to store a data lake and multiple existing spectrum administration service (SAS) configuration commands. The processor may be configured to perform first SAS operations in accordance with the existing SAS configuration commands, collect multiple channel parameters from one or more communication channels configured to provide connectivity between user equipment and a core network, store the channel parameters in the data lake, monitor the channel parameters in the data lake, and generate optimized SAS configuration commands based at least in part upon the channel parameters. Further, the processor is configured to compare the optimized SAS configuration commands to the existing SAS configuration commands and perform second SAS operations in accordance with the optimized SAS configuration commands.

20 Claims, 3 Drawing Sheets

(56) References Cited

U.S. PATENT DOCUMENTS

| | | |
|---|---|---|
| 11,178,182 B2 | 11/2021 | Saxena et al. |
| 11,233,821 B2 | 1/2022 | Yadav et al. |
| 11,240,153 B1 | 2/2022 | Vasseur et al. |
| 11,321,337 B2 | 5/2022 | Nucci et al. |
| 2019/0378073 A1 | 12/2019 | Lopez et al. |
| 2020/0027052 A1 | 1/2020 | Aiyer |
| 2020/0211141 A1 | 7/2020 | Argyle et al. |
| 2020/0372576 A1 | 11/2020 | Sundaram et al. |
| 2020/0394455 A1 | 12/2020 | Lee et al. |
| 2021/0076223 A1* | 3/2021 | Taneja ............ G06N 20/00 |
| 2022/0007374 A1* | 1/2022 | Sevindik .......... H04W 16/22 |
| 2022/0021652 A1 | 1/2022 | Moghe et al. |
| 2022/0075889 A1 | 3/2022 | Friedman |
| 2022/0076165 A1 | 3/2022 | Minkin et al. |
| 2022/0150760 A1* | 5/2022 | Balasubramanian ........... H04L 43/0876 |
| 2022/0182128 A1 | 6/2022 | Taneja et al. |
| 2022/0209971 A1 | 6/2022 | Doshi et al. |
| 2022/0215028 A1 | 7/2022 | Nanda et al. |
| 2022/0383417 A1 | 12/2022 | Cummings |
| 2023/0062655 A1 | 3/2023 | Wan et al. |
| 2023/0164756 A1* | 5/2023 | Vankayala .......... H04W 72/121 370/329 |
| 2023/0199820 A1* | 6/2023 | Balasubramanian ........... H04W 28/0862 370/329 |
| 2023/0370865 A1* | 11/2023 | Reeves ............. H04W 24/02 |
| 2024/0394149 A1* | 11/2024 | Ambaljeri .......... G06F 16/2358 |
| 2025/0008346 A1* | 1/2025 | Singh .............. G06N 20/00 |

OTHER PUBLICATIONS

Definition of "monitoring", Oxford Dictionary, <https://www.oed.com/dictionary/monitor_v?tab=meaning_and_use#36265198>, 1944, p. 1-5 (Year: 1944).*

World Wide Technology, CBRS Technology Overview, Aug. 11, 2020, Retrieved from <https://www.wwt.com/video/cbrs-technology-overview>, p. 1-16 (Year: 2020).*

PCT International Search Report and Written Opinion of the International Searching Authority, or the Declaration for International Application No. PCT/US2024/041042, mailed Nov. 22, 2024 (Nov. 22, 2024), 17 pages.

* cited by examiner

SYSTEM AND METHOD TO GENERATE OPTIMIZED SPECTRUM ADMINISTRATION SERVICE (SAS) CONFIGURATION COMMANDS

TECHNICAL FIELD

The present disclosure relates generally to optimization of Spectrum Administration Service (SAS) operations in a communication system, and more specifically to a system and a method to generate optimized SAS configuration commands.

BACKGROUND

In some wireless communications systems, a Spectrum Access System (SAS) is a frequency coordination system that manages the Citizens Broadband Radio Service (CBRS) spectrum in the 3.5 gigahertz (GHz) band. The SAS manages spectrum sharing on a dynamic, as-needed basis across three tiers. The SAS may provide priority to a top tier, while preventing interference to lower tiers. The three tiers in the CBRS band comprise Incumbent Access licenses, Priority Access licenses (PALs), and General Authorized Access licenses (GAA). The Federal Communications Commission (FCC) requires the use of a SAS administrator to coordinate and manage operations of the three tiers to prevent interference to higher priority users. The SAS dynamically manages spectra for all three tiers with first priority for incumbents, second priority for PALs and third priority for GAA users.

SUMMARY OF THE DISCLOSURE

In one or more embodiments, the system and the method disclosed herein generate optimized Spectrum Administration Service (SAS) configuration commands. In particular, the system and the method may implement one or more existing SAS configuration commands to route and assign spectra of certain communication channels to one or more connected devices. In performing one or more SAS operations (e.g., routing operations and spectra assigning operations), multiple channel parameters are determined from the communication channels during the SAS operations. In some embodiments, the channel parameters are dynamically stored in a data lake. At this stage, a machine learning algorithm is executed to monitor, analyze, and structure the channel parameters in the data lake. A channel optimization controller may be configured to generate the optimized SAS configuration commands based at least in part upon outputs from the machine learning algorithm. In some embodiments, a SAS administrator may monitor activity on one, some, or all Citizen Broadband Radio Service (CBRS) channels to obtain the channel parameters. The optimized SAS configuration commands may dynamically modify some of the communication channels that are affected by interference (e.g., low quality of service and performance) by automatically moving CBRS channels to the best frequency available in a given area.

In one or more embodiments, the system and the method described herein are integrated into a practical application to perform SAS operations based at least in part upon optimized SAS configuration commands. In particular, the system and the method are integrated into a practical application of dynamically updating the SAS operations to account for current and historical changes to the CBRS channels. For example, the system and the method may generate optimized SAS configuration commands that are performed to correct interference identified in one of the CBRS channels over time based at least in part one or more conditions. The conditions may comprise determining a traffic level in a given CBRS channel at a time of day and routing modifications to case tension in the given CBRS channel. The system and the method may train the machine learning algorithm with the conditions and the routing modifications. In a future event, based at least in part on the training, the system and the method may implement the machine learning algorithm to preemptively provide the routing modifications as soon as the conditions are identified.

In addition, the system and method described herein are integrated into a technical advantage of increasing processing speeds in a computer system, because processors associated with the system and the method comprise a machine learning algorithm that actively generate insights for any identified channel parameters. In the machine learning algorithm, the system and the method may provide the optimized SAS configuration commands based on some or all raw data obtained from the CBRS channels. As the machine learning algorithm is trained to account for many of the situations and conditions occurring in the CBRS channels, multiple optimized SAS configuration commands are generated to relieve stress conditions in communication networks during the SAS operations. As a result, processing speed during SAS operations is improved because the system and the method comprise optimized SAS configuration commands that may preventively set conditions during the SAS operations to prevent stress in the networks and reduce traffic. Under these improvements, the system and the method provide a practical application of maintaining operations in the network for longer periods of time by reducing downtime caused by heavy traffic conditions in the networks.

In one or more embodiments, the system and the method may be performed by an apparatus, such as a server, communicatively coupled to multiple network components in a core network, one or more base stations in a radio access network, and one or more user equipment. Further, the system may be a wireless communication system, that comprises the apparatus. In addition, the system and the method may be performed as part of a process performed by the apparatus communicatively coupled to the network components in the core network. As a non-limiting example, the apparatus may comprise a memory and a processor communicatively coupled to one another. The memory may be configured to store a data lake comprising one or more channel parameters, a machine learning algorithm configured to analyze and structure the channel parameters in the data lake, and multiple existing SAS configuration commands. The processor may be configured to perform first SAS operations in accordance with the existing SAS configuration commands, collect multiple channel parameters from multiple communication channels configured to provide connectivity between user equipment and a core network, store the channel parameters in the data lake, monitor the channel parameters in the data lake in response to executing the machine learning algorithm, and generate optimized SAS configuration commands based at least in part upon the channel parameters. The optimized SAS configuration commands comprising being possible updates to the existing SAS configuration commands. Further, the processor is configured to compare the optimized SAS configuration commands to the existing SAS configuration commands, determine whether the optimized SAS configuration commands comprise commands that are different to those comprised in the existing SAS configuration commands, and perform second SAS operations in accordance with the optimized SAS configuration commands in response to determining that the optimized SAS configuration commands comprise commands that are different to those comprised in the existing SAS configuration commands.

Certain embodiments of this disclosure may comprise some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
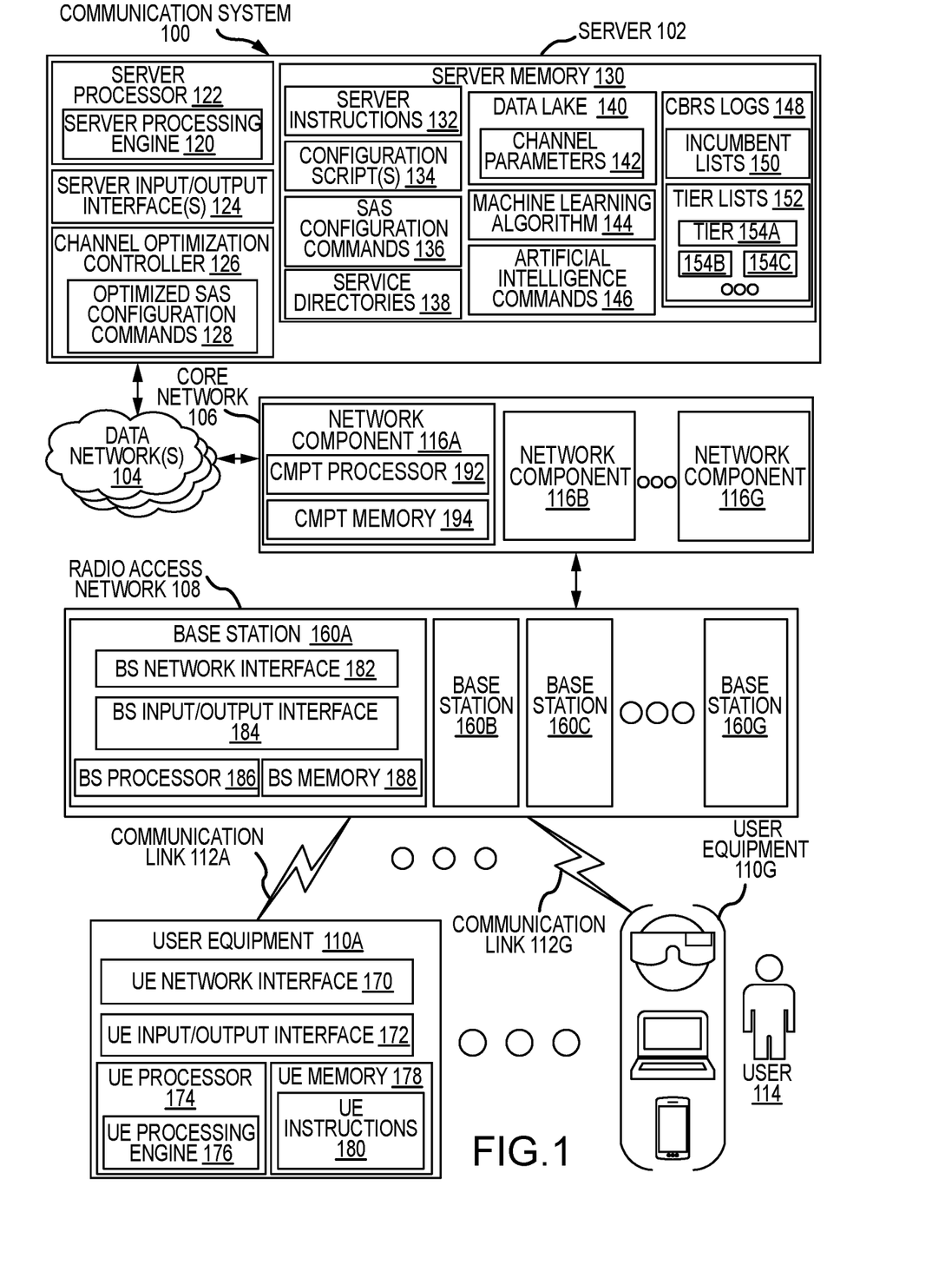
FIG. 1 illustrates an example communication system in accordance with one or more embodiments.
Figure 2:
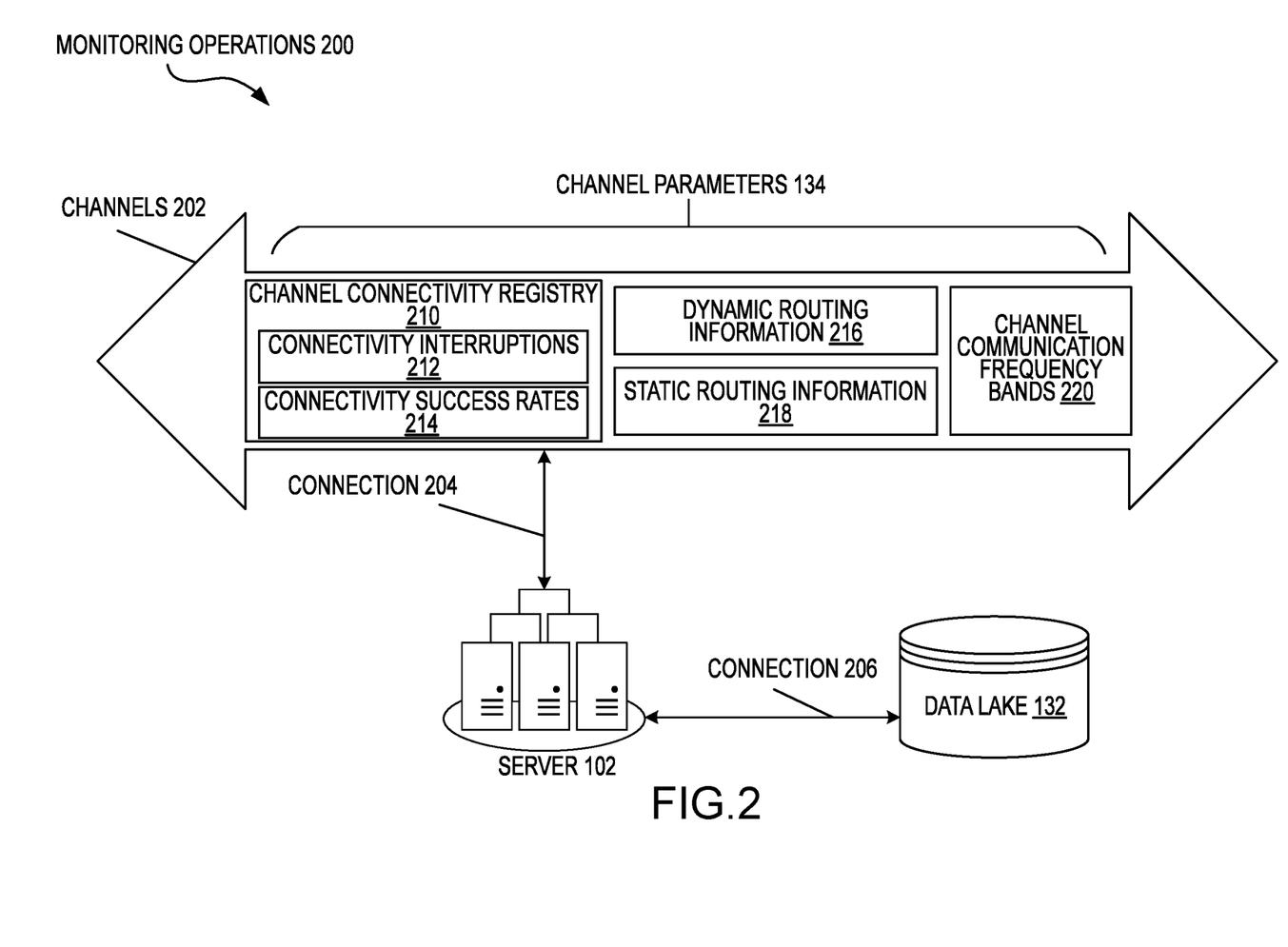
FIG. 2 illustrates examples of one or more monitoring operations performed in conjunction with the example communication system of FIG. 1.
Figure 3:
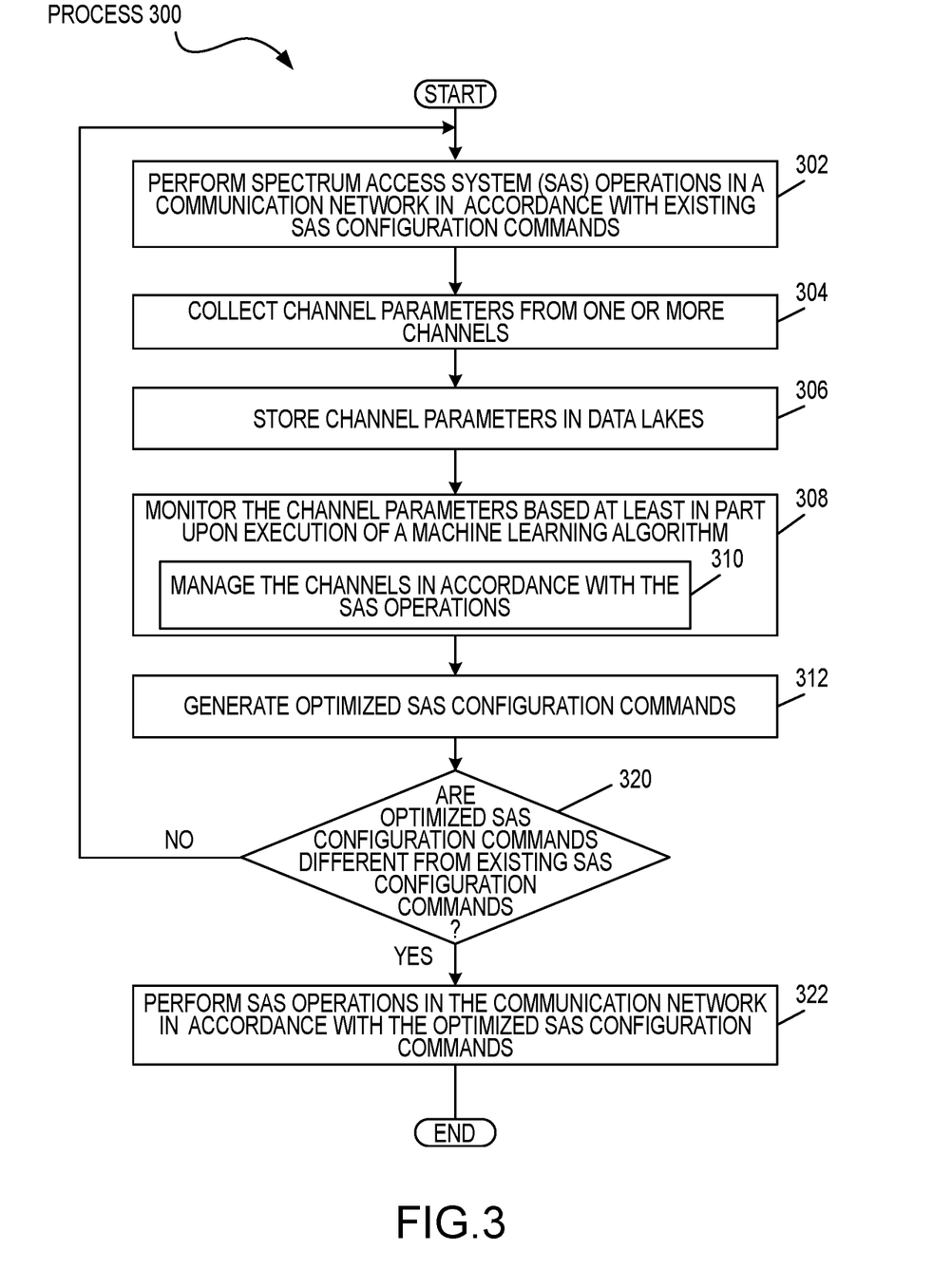
FIG. 3 illustrates an example flowchart of a method to generate optimized Spectrum Administration Service (SAS) configuration commands in conjunction with the operational flow of FIG. 2.

In one or more embodiments, a Spectrum Administration Service (SAS) is a frequency coordination system that manages Citizens Broadband Radio Service (CBRS) spectrum in the 3.5 gigahertz (GHz) band. As described above, this disclosure provides various systems and methods to generate optimized SAS configuration commands. FIG. 1 illustrates a communication system 100 in which a server 102 performs one or more SAS operations based on historical configuration commands derived from the CBRS spectrum. FIG. 2 illustrates monitoring operations 200 performed by the communication system 100 of FIG. 1. FIG. 3 illustrates a process 300 performed by the communication system 100 of FIG. 1.

Communication System Overview

FIG. 1 illustrates a diagram of a communication system 100 (e.g., a wireless communication system) that comprises a server 102 configured to generate optimized SAS configuration commands, in accordance with one or more embodiments. In the communication system 100 of FIG. 1, the server 102 may be communicatively coupled to one or more data networks 104, a core network 106, and a radio access network (RAN) 108. In FIG. 1, the server is communicatively coupled to multiple user equipment 110A-110G (collectively, user equipment 110) via the RAN 108 via multiple corresponding communication links 112A-112G (collectively, communication links 112) established between each user equipment 110 and the RAN 108. As represented by a user equipment 110G, the user equipment 110 may be operated or attended to by one or more users 114. In the example of FIG. 1, the server 102 may be communicatively coupled to multiple additional devices in the communication system 100. While FIG. 1 shows the server 102 connected directly to the one or more data networks 104, the server 102 may be located inside the core network 106 as part of one or more of the network components (e.g., any of the network components 116A-116G) in the core network 106.

In one or more embodiments, the communication system 100 comprises the user equipment 110, the RAN 108, the core network 106, the one or more data networks 104, and the server 102. In come embodiments, the communication system 100 may comprise a Fifth Generation (5G) mobile network or wireless communication system, utilizing high frequency bands (e.g., 24 Gigahertz (GHz), 39 GHz, and the like) or lower frequency bands such (e.g., Sub 6 GHZ). In this regard, the communication system 100 may comprise a large number of antennas. In some embodiments, the communication system may perform one or more monitoring operations associated with the 5G New Radio (NR) protocols described in reference to the Third Generation Partnership Project (3GPP). As part of the 5G NR protocols, the communication system 100 may perform one or more millimeter (mm) wave technology operations to improve bandwidth or latency in wireless communications.

In some embodiments, the communication system 100 may be configured to partially or completely enable communications via one or more various radio access technologies (RATs), wireless communication technologies, or telecommunication standards, such as Global System for Mobiles (GSM) (e.g., Second Generation (2G) mobile networks), Universal Mobile Telecommunications System (UMTS) (e.g., Third Generation (3G) mobile networks), Long Term Evolution (LTE) of mobile networks, LTE-Advanced (LTE-A) mobile networks, 5G NR mobile networks, or Sixth Generation (6G) mobile networks.

Communication System Components

Server

The server 102 is generally any device or apparatus that is configured to process data, communicate with the data networks 104, one or more network components 116A-116G (collectively, network components 116) in the core network 106, the RAN 108, and the user equipment 110. The server 102 may be configured to monitor, track data, control routing of signal, and control operations of certain electronic components in the communication system 100, associated databases, associated systems, and the like, via one or more interfaces. The server 102 is generally configured to oversee operations of the server processing engine 120. The operations of the server processing engine 120 are described further below. In some embodiments, the server 102 comprises a server processor 122, one or more server Input (I)/Output (O) interfaces 124, a channel optimization controller 126 configured to generate one or more optimized SAS configuration commands 128, and a server memory 130 communicatively coupled to one another. The server 102 may be configured as shown, or in any other configuration. As described above, the server 102 may be located in one of the network components 116 located in the core network 106 and may be configured to perform one or more network functions (NFs) associated with monitoring operations 200 described in reference to FIG. 2.

The server processor 122 may comprise one or more processors operably coupled to and in signal communication with the one or more server I/O interfaces 124, the channel optimization controller 126, and the server memory 130. The server processor 122 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The server processor 122 may be a programmable logic device, a microcontroller, a microprocessor, or any suitable combination of the preceding. The one or more processors in the server processor 122 are configured to process data and may be implemented in hardware or software executed by hardware. For example, the server processor 122 may be an 8-bit, a 16-bit, a 32-bit, a 64-bit, or any other suitable architecture. The server processor 122 may comprise an arithmetic logic unit (ALU) to perform arithmetic and logic operations, processor registers that supply operands to the ALU, and store the results of ALU operations, and a control unit that fetches software instructions such as server instructions 132 from the server memory 130 and executes the server instructions 132 by directing the coordinated operations of the ALU, registers and other components via the server processing engine 120. The server processor 122 may be configured to execute various instructions. For example, the server processor 122 may be configured to execute the server instructions 132 to perform functions or perform operations disclosed herein, such as some or all of those described with respect to FIGS. 1-3. In some embodiments, the functions described herein are implemented using logic units, FPGAs, ASICs, DSPs, or any other suitable hardware or electronic circuitry.

In one or more embodiments, the server I/O interfaces 124 may be hardware configured to perform one or more monitoring operations 200 described in reference to FIG. 2. The server I/O interfaces 124 may comprise one or more antennas as part of a transceiver, a receiver, or a transmitter for communicating using one or more wireless communication protocols or technologies. In some embodiments, the server I/O interfaces 124 may be configured to communicate using, for example, NR or LTE using at least some shared radio components. In other embodiments, the server I/O interfaces 124 may be configured to communicate using single or shared radio frequency (RF) bands. The RF bands may be coupled to a single antenna, or may be coupled to multiple antennas (e.g., for a multiple-input multiple output (MIMO) configuration) to perform wireless communications. The server I/O interfaces 124 may be configured to comprise one or more peripherals such as a network interface, one or more administrator interfaces, and one or more displays.

The server network interfaces that may be part of the server I/O interfaces 124 may be any suitable hardware or software (e.g., executed by hardware) to facilitate any suitable type of communication in wireless or wired connections. These connections may comprise, but not be limited to, all or a portion of network connections coupled to additional network components 116 in the core network 106, the RAN 108, the user equipment 110, the Internet, an Intranet, a private network, a public network, a peer-to-peer network, the public switched telephone network, a cellular network, a local area network (LAN), a metropolitan area network (MAN), a wide area network (WAN), and a satellite network. The server network interface may be configured to support any suitable type of communication protocol.

The one or more administrator interfaces that may be part of the server I/O interfaces 124 may be user interfaces configured to provide access and control to of the server 102 to one or more users (e.g., the user 114) or electronic devices. The one or more users may access the server memory 130 upon confirming one or more access credentials to demonstrate that access or control to the server 102 may be modified. In some embodiments, the one or more administrator interfaces may be configured to provide hardware and software resources to the one or more users. Examples of user devices comprise, but are not limited to, a laptop, a computer, a smartphone, a tablet, a smart device, an Internet-of-Things (IoT) device, a simulated reality device, an augmented reality device, or any other suitable type of device. The administrator interfaces may enable access to one or more graphical user interfaces (GUIs) via an image generator display (e.g., one or more displays), a touchscreen, a touchpad, multiple keys, multiple buttons, a mouse, or any other suitable type of hardware that allow users to view data or to provide inputs into the server 102. The server 102 may be configured to allow users to send requests to one or more user equipment 110.

In the example of FIG. 1, the one or more displays that may be part of the server I/O interfaces 124 may be configured to display a two-dimensional (2D) or three-dimensional (3D) representation of a service. Examples of the representations may comprise, but are not limited to, a graphical or simulated representation of an application, diagram, tables, or any other suitable type of data information or representation. In some embodiments, the one or more displays may be configured to present visual information to one or more users (not shown). The one or more displays may be configured to present visual information to the one or more users updated in real-time. The one or more displays may be a wearable optical display (e.g., glasses or a head-mounted display (HMD)) configured to reflect projected images and enable user to see through the one or more displays. For example, the one or more displays may comprise display units, one or more lenses, or one or more semi-transparent mirrors embedded in an eye glass structure, a visor structure, or a helmet structure. Examples of display units comprise, but are not limited to, a cathode ray tube (CRT) display, a liquid crystal display (LCD), a liquid crystal on silicon (LCOS) display, a light emitting diode (LED) display, an organic LED (OLED) display, an active-matrix OLED (AMOLED) display, a projector display, or any other suitable type of display. In another embodiment, the one or more displays are a graphical display on the server 102. For example, the graphical display may be a tablet display or a smartphone display configured to display the data representations.

In some embodiments, the channel optimization controller 126 may be any combination of a baseband processor, analog RF signal processing circuitry (e.g., including filters, mixers, oscillators, amplifiers, and the like), or digital processing circuitry (e.g., for digital modulation as well as other digital processing). For example, the channel optimization controller 126 may be configured to allocate power, frequency, and sensing resources during wireless monitoring operations 200 described in reference to FIG. 2. In some embodiments, the channel optimization controller 126 may be configured to generate one or more of optimized SAS configuration commands 128.

The server memory 130 may be volatile or non-volatile and may comprise a read-only memory (ROM), random-access memory (RAM), ternary content-addressable memory (TCAM), dynamic random-access memory (DRAM), and static random-access memory (SRAM). The server memory 130 may be implemented using one or more disks, tape drives, solid-state drives, and/or the like. The server memory 130 is operable to store the server instructions 132, one or more configuration scripts 134, one or more existing SAS configuration commands 136, one or more service directories 138, a data lake 140 comprising one or more determined channel parameters 142, a machine learning algorithm 144, multiple artificial intelligence commands 146, one or more CBRS logs 148, and one or more tier lists 152 comprising multiple distribution tiers 154A-154C (collectively, tiers 154). In the server memory 130, the server instructions 132 may comprise commands and controls for operating one or more specific NFs in the core network 106 when executed by the server processing engine 120 of the server processor 122.

In one or more embodiments, the one or more configuration scripts 134 are configured to instruct one or more network components 116 in the core network 106 to establish one or more SAS configuration commands 136 or one of the optimized SAS configuration commands 128 to perform the SAS operations. The one or more configuration scripts 134 enable automation of the routing and configuration of network components 116 in the core network 106. In this regard, the one or more configuration scripts 134 may reconfigure multiple cloud-NFs (CNFs) that establish initial communication sessions with at least one NRF in a communication path comprising one or more additional network components 116. In this regard, the one or more configuration scripts 134 instruct routing and configuration of communication procedures based on static routing commands to restore restores services in the core network 106.

In one or more embodiments, the SAS configuration commands 136 are configured to establish one or more communication sessions between the network components 116 in the core network 106 and the user equipment 110. Each configuration command of the SAS configuration commands 136 may be configured to provide control information to perform one or more of the SAS operations. Further, the SAS configuration commands 136 may be routing and configuration information for reinstating or reestablishing communication sessions. The SAS configuration commands 136 may be dynamically or periodically updated from the network components 116 in the core network 106. In one or more embodiments, the optimized SAS configuration commands 128 are configured to establish one or more optimized communication sessions between the network components 116 in the core network 106 and the user equipment 110. Each configuration command of the optimized SAS configuration commands 128 may be configured to provide control information to perform one or more of the SAS operations based at least in part upon the analyzed data from the data lake 140. Further, the optimized SAS configuration commands 128 may be routing and configuration information for reinstating or reestablishing communication sessions. The optimized SAS configuration commands 128 may be dynamically or periodically updated from the network components 116 in the core network 106. In some embodiments, the optimized SAS configuration commands 128 may comprise possible updates to the existing SAS configuration commands 136.

The service directories 138 may be configured to store service-specific information and/or user-specific information. The service directories 138 may enable the server 102 to confirm user credentials to access one or more network components (e.g., one of the network components 116 configured to perform one or more NFs in the core network 106. The service directories 138 may be configured to store provider-specific information. The service directories 138 may enable the server 102 to validate credentials associated with a specific provider (e.g., one of the CNFs) against corresponding user-specific information in the service directories 138.

In some embodiments, the data lake 140 is a storage repository configured to store large amount of structured, semi-structured, and unstructured data. In some embodiments, the data lake 140 is configured to store every type of data in its native format without fixed limits. The data lake 140 may be updated periodically or dynamically (e.g., updated in real-time). In some embodiments, the data lake 140 may be located in the server memory 130 or located at a remote location different from a location of the server 102. The data lake 140 may be configured to store one or more of the channel parameters 142 in a corresponding raw format preselected in accordance with one or more rules or policies.

In one or more embodiments, the machine learning algorithm 144 may be configured to converts the data stored by the data lake 140 to generate structured data for further analysis. Further, the machine learning algorithm 144 may be configured to interpret and transform the channel parameters 142 into structured data sets and subsequently stored as files or tables. The machine learning algorithm 144 may cleanse, normalize raw data, and derive intermediate data to generate uniform data in terms of encoding, format, and data types. The machine learning algorithm 144 may be executed to run user queries and advanced analytical tools on the structured data. The machine learning algorithm 144 may be configured to generate the one or more artificial intelligence commands 146 based on current channel parameters 142 and the existing SAS configuration commands 136. In turn, the channel optimization controller 126 may be configured to generate the optimized SAS configuration commands 128 based on the outputs of the machine learning algorithm 144. The artificial intelligence commands 146 may be parameters that modify routing of resources in the CBRS channels to be allocated in the communication network. The artificial intelligence commands 146 may be combined with the existing SAS configuration commands 136 to create the optimized SAS configuration commands 128.

In some embodiments, the CBRS logs 148 may comprise the incumbent lists 150 and the tier lists 152. The CBRS logs 148 may comprise information listing the resources of the CBRS channels available for SAS management. The incumbent lists 150 may comprise lists of electronic devices (e.g., the user equipment 110) that are configured to receive resources allocated from the server 102. The tier lists 152 comprise one or more priority levels for each of the electronic devices. In one or more embodiments, a SAS manages spectrum sharing on a dynamic, as-needed basis across three tiers 154. The SAS may provide priority to a top tier 154A, while preventing interference to lower tiers. The three tiers 154 shown in the CBRS band comprise Incumbent Access licenses, Priority Access licenses (PALs), and General Authorized Access licenses (GAA). In some embodiments, the server 102 may dynamically manage spectra for all three tiers 154 with first priority for incumbents in a first tier 154A, second priority for PALs in a second tier 154B, and third priority for GAA users in a third tier 154C. In some embodiments, to use the CBRS spectrum, the server 102 may use the CBRS logs 148 to assign one or more resources and deploy corresponding CBRS access points. For example, one of the user equipment 110 may request use of the CBRS channels via a connection request. In turn, the server 102 (e.g., acting as at least a part of the SAS administrator) may receive connectivity data in the request indicating latitude, longitude, and height into a SAS database (e.g., the server memory 130). In some embodiments, the server 102 (e.g., the SAS administrator) may determine whether the requested spectrum is available. The server 102 may then assign spectrum channels and grant authority for CBRS Devices (CBSDs) to operate in the channel in accordance with the priority level (e.g., depending in the tiers 154) assigned to each CBSD. In this regard, the server 102 may authorize allocation of appropriate transmission power levels and allocation of channel resources.

User Equipment

In one or more embodiments, each of the user equipment 110 (e.g., the user equipment 110A and a user equipment 110G representative of the user equipment 110A-110G) may be any computing device configured to communicate with other devices, such as the server 102, other network components 116 in the core network 106, databases, and the like in the communication system 100. Each of the user equipment 110 may be configured to perform specific functions described herein and interact with one or more network components 116 in the core network 106 via one or more base stations 160. Examples of user equipment 110 comprise, but are not limited to, a laptop, a computer, a smartphone, a tablet, a smart device, an IoT device, a simulated reality device, an augmented reality device, or any other suitable type of device.

In one or more embodiments, referring to the user equipment 110A as a non-limiting example of the user equipment 110, the user equipment 110A may comprise a user equipment (UE) network interface 170, a UE I/O interface 172, a UE processor 174 configured to execute a UE processing engine 176, and a UE memory 178 comprising one or more UE instructions 180. The UE network interface 170 may be any suitable hardware or software (e.g., executed by hardware) to facilitate any suitable type of communication in wireless or wired connections. These connections may comprise, but not be limited to, all or a portion of network connections coupled to additional network components 116 in the core network 106, the RAN 108, the Internet, an Intranet, a private network, a public network, a peer-to-peer network, the public switched telephone network, a cellular network, a local area network (LAN), a metropolitan area network (MAN), a wide area network (WAN), and a satellite network. The UE network interface 170 may be configured to support any suitable type of communication protocol.

The UE I/O interface 172 may be hardware configured to perform one or more monitoring operations 200 described in reference to FIG. 2. The UE I/O interface 172 may comprise one or more antennas as part of a transceiver, a receiver, or a transmitter for communicating using one or more wireless communication protocols or technologies. In some embodiments, the UE I/O interface 172 may be configured to communicate using, for example, 5G NR or LTE using at least some shared radio components. In other embodiments, the UE I/O interface 172 may be configured to communicate using single or shared RF bands. The RF bands may be coupled to a single antenna, or may be coupled to multiple antennas (e.g., for a MIMO configuration) to perform wireless communications. In some embodiments, the user equipment 110A may comprise capabilities for voice communication, mobile broadband services (e.g., video streaming, navigation, and the like), or other types of applications. In this regard, the UE I/O interface 172 of the user equipment 110A may communicate using machine-to-machine (M2M) communication, such as machine-type communication (MTC), or another type of M2M communication.

In some embodiments, the user equipment 110A is communicatively coupled to one or more of the base stations 160 via one or more communication links 112 (e.g., the communication link 112A and the communication link 112G representative of the communication links 112). The user equipment 110A may be a device with cellular communication capability such as a mobile phone, a hand-held device, a computer, a laptop, a tablet, a smart watch or other wearable device, or virtually any type of wireless device. In some applications, the user equipment 110 may be referred to as a UE, UE device, or terminal.

The UE processor 174 may comprise one or more processors operably coupled to and in signal communication with the UE network interface 170, the UE I/O interface 172, and the UE memory 178. The UE processor 174 is any electronic circuitry, including, but not limited to, state machines, one or more CPU chips, logic units, cores (e.g., a multi-core processor), FPGAs, ASICs, or DSPs. The UE processor 174 may be a programmable logic device, a microcontroller, a microprocessor, or any suitable combination of the preceding. The one or more processors in the UE processor 174 are configured to process data and may be implemented in hardware or software executed by hardware. For example, the UE processor 174 may be an 8-bit, a 16-bit, a 32-bit, a 64-bit, or any other suitable architecture. The UE processor 174 comprises an ALU to perform arithmetic and logic operations, processor registers that supply operands to the ALU, and store the results of ALU operations, and a control unit that fetches software instructions such as the UE instructions 180 from the UE memory 178 and executes the UE instructions 180 by directing the coordinated operations of the ALU, registers, and other components via the UE processing engine 176. The UE processor 174 may be configured to execute various instructions. For example, the UE processor 174 may be configured to execute the UE instructions 180 to implement functions or perform operations disclosed herein, such as some or all of those described with respect to FIGS. 1-3. In some embodiments, the functions described herein are implemented using logic units, FPGAs, ASICs, DSPs, or any other suitable hardware or electronic circuitry.

Radio Access Network

In one or more embodiments, the RAN 108 enables the user equipment 110 to access one or more services in the core network 106. The one or more services may be a mobile telephone service, a Short Message Service (SMS) message service, a Multimedia Message Service (MMS) message service, an Internet access, cloud computing, or other types of data services. The RAN 108 may comprise the base stations 160 in signal communication with the user equipment 110 via the one or more communication links 112. Each of the base stations 160 may service the user equipment 110. In some embodiments, while multiple base stations 160 are shown connected to multiple user equipment 110 via the communication link 112, one or more additional base stations 160 may be connected to one or more additional user equipment 110 via one or more additional communication links 112. For example, the base station 160A-110G may exchange connectivity signals with the user equipment 110A via the communication link 112A. In another example, the base station 160G may exchange connectivity signals with the user equipment 110G via the communication link 112G. In yet another example, the base stations 160 may service some user equipment 110 located within a geographic area serviced by one of the base stations 160.

In one or more embodiments, referring to the base station 160A as a non-limiting example of the base station 160, the base station 160A may comprise a base station (BS) network interface 182, a BS I/O interface 184, a BS processor 186, and a BS memory 188. The BS network interface 182 may be any suitable hardware or software (e.g., executed by hardware) to facilitate any suitable type of communication in wireless or wired connections between the core network 106 and the user equipment 110. These connections may comprise, but not be limited to, all or a portion of network connections coupled to additional network components 116 in the core network 106, other base stations 160, the user equipment 110, the Internet, an Intranet, a private network, a public network, a peer-to-peer network, the public switched telephone network, a cellular network, a LAN, a MAN, a WAN, and a satellite network. The BS network interface 182 may be configured to support any suitable type of communication protocol.

The BS I/O interface 184 may be hardware configured to perform one or more monitoring operations 200 described in reference to FIG. 2. The BS I/O interface 184 may comprise one or more antennas as part of a transceiver, a receiver, or a transmitter for communicating using one or more wireless communication protocols or technologies. In some embodiments, the BS I/O interface 184 may be configured to communicate using, for example, 5G NR or LTE using at least some shared radio components. In other embodiments, the BS I/O interface 184 may be configured to communicate using single or shared RF bands. The RF bands may be coupled to a single antenna, or may be coupled to multiple antennas (e.g., for a MIMO configuration) to perform wireless communications. In some embodiments, the base station 160A may allocate resources in accordance with one or more routing and configuration operations obtained from the core network 106. In some embodiments, resources may be allocated to enable capabilities in the user equipment 110 for voice communication, mobile broadband services (e.g., video streaming, navigation, and the like), or other types of applications.

In some embodiments, the base station 160A is communicatively coupled to one or more of the user equipment 110 via the one or more communication links 112. In some applications, the base stations 160A may be referred to as BS, evolved Node B (eNodeB or eNB), a next generation Node B, gNodeB, gNB, or terminal.

The BS processor 186 may comprise one or more processors operably coupled to and in signal communication with the BS network interface 182, the BS I/O interface 184, and the BS memory 188. The BS processor 186 is any electronic circuitry, including, but not limited to, state machines, one or more CPU chips, logic units, cores (e.g., a multi-core processor), FPGAs, ASICs, or DSPs. The BS processor 186 may be a programmable logic device, a microcontroller, a microprocessor, or any suitable combination of the preceding. The one or more processors in the BS processor 186 are configured to process data and may be implemented in hardware or software executed by hardware. For example, the BS processor 186 may be an 8-bit, a 16-bit, a 32-bit, a 64-bit, or any other suitable architecture. The BS processor 186 comprises an ALU to perform arithmetic and logic operations, processor registers that supply operands to the ALU, and store the results of ALU operations, and a control unit that fetches software instructions (not shown) from the BS memory 188 and executes the software instructions by directing the coordinated operations of the ALU, registers, and other components via a processing engine (not shown) in the BS processor 186. The BS processor 186 may be configured to execute various instructions. For example, the BS processor 186 may be configured to execute the software instructions to implement functions or perform operations disclosed herein, such as some or all of those described with respect to FIGS. 1-3. In some embodiments, the functions described herein are implemented using logic units, FPGAs, ASICs, DSPs, or any other suitable hardware or electronic circuitry.

Core Network

The core network 106 may be a network configured to manage communication sessions for the user equipment 110. In one or more embodiments, the core network 106 may establish connections between user equipment 110 and a particular data network 104 in accordance with one or more communication protocols. In the example of FIG. 1, the core network 106 comprises one or more network components configured to perform one or more NFs. In some embodiments, the core network 106 enables the user equipment 110 to communicate with the server 102, or another type of device, located in a particular data network 104 or in signal communication with a particular data network 104. The core network 106 may implement a communication method that does not require the establishment of a specific communication protocol connection between the user equipment 110 and one or more of the data networks 104. The core network 106 may include one or more types of network devices (not shown), which may perform different NFs.

In some embodiments, the core network 106 may include a 5G NR or an LTE access network (e.g., an evolved packet core (EPC) network) among others. In this regard, the core network 106 may comprise one or more logical networks implemented via wireless connections or wired connections. Each logical network may comprise an end-to-end virtual network with dedicated power, storage, or computation resources. Each logical network may be configured to perform a specific application comprising individual policies, rules, or priorities. Further, each logical network may be associated with a particular Quality of Service (QoS) class, type of service, or particular user associated with one or more of the user equipment 110. For example, a logical network may be a Mobile Private Network (MPN) configured for a particular organization. In this example, when the user equipment 110A is configured and activated by a wireless network associated with the RAN 108, the user equipment 110A may be configured to connect to one or more particular network slices (i.e., logical networks) in the core network 106. Any logical networks or slices that may be configured for the user equipment 110A may be configured using a network component (e.g., one of the network components 116 (e.g., the network component 116A, the network component 116B, and the network component 116G representing the network component 116A-116G) of FIG. 1.

In one or more embodiments, each of the network components 116 may comprise a component processor 192 configured to perform one or more similar operations to those described in reference to the BS processor 186 and the UE processor 174. In other embodiments, each of the network components 116 may comprise a component memory 194 configured to perform one or more similar operations to those described in reference to the BS memory 188 and the UE memory 178.

Data Networks

In the example system 100 of FIG. 1, the data networks 104 may facilitate communication within the communication system 100. This disclosure contemplates that the data networks 104 may be any suitable network operable to facilitate communication between the server 102, the core network 106, the RAN 108, and the user equipment 110. The data networks 104 may include any interconnecting system capable of transmitting audio, video, signals, data, messages, or any combination of the preceding. The data networks 104 may include all or a portion of a LAN, a WAN, an overlay network, a software-defined network (SDN), a virtual private network (VPN), a packet data network (e.g., the Internet), a mobile telephone network (e.g., cellular networks, such as 4G or 5G), a Plain Old Telephone (POT) network, a wireless data network (e.g., WiFi, WiGig, WiMax, and the like), a Long Term Evolution (LTE) network, a Universal Mobile Telecommunications System (UMTS) network, a peer-to-peer (P2P) network, a Bluetooth network, a Near Field Communication network, a Zigbee network, or any other suitable network, operable to facilitate communication between the components of the communication system 100. In other embodiments, the communication system 100 may not have all of these components or may comprise other elements instead of, or in addition to, those above.

Monitoring Operations

FIG. 2 illustrates one or more communication operations 200 in accordance with one or more embodiments. The communication operations 200 may be performed by the server 102. In the non-limiting example of FIG. 2, the server 102 may be communicatively coupled to the data lake 140. The data lake 140 may be configured to be stored in the server memory 130. The data lake 140 may be configured to be a standalone database in a location remote to the server 102. In the example of FIG. 2, the server 102 is connected to the CBRS channels 202 in the CBRS spectrum via the connection 204 and the data lake 140 via the connection 206. The connection 204 and the connection 206 may be internal or external to the server 102 as part of one of the server I/O interfaces 124.

In one or more embodiments, the channel parameters 142 comprise a channel connectivity registry 210 comprising connectivity interruptions 212 and connectivity success rates 214, dynamic routing information 216, static routing information 218, and one or more channel communication frequency bands 220. The connectivity interruptions 212 may be communication interruptions in the communication channels 202 over a predefined time duration. The connectivity success rates 214 may be a percentage of successful communication transactions in the communication channels 202 over the predefined time duration. The dynamic routing information 216 may be routing information that is continuously or dynamically changed in the channels 202 during one or more predefined time periods. The static routing information 218 may be routing information that remains relatively unchanged (e.g., when compared to the dynamic routing information 216) in the channels 202 during one or more predefined time periods. The one or more channel communication frequency bands 220 may be information comprising resources corresponding to the managed portions of the channels 202 that are controlled by the server 102.

Example Process to Generate Optimized SAS Configuration Commands

FIG. 3 illustrate respective example flowchart of the process 300, in accordance with one or more embodiments. Modifications, additions, or omissions may be made to the process 300. The process 300 may include more, fewer, or other operations than those shown above. For example, operations may be performed in parallel or in any suitable order. While at times discussed as the server 102, one or more of the network components 116, one or more of the base stations 160, components of any of thereof, or any suitable system or components of the security system 100 may perform one or more operations of the process 300. For example, one or more operations of the process 300 may be implemented, at least in part, in the form of server instructions 132 of FIG. 1, stored on non-transitory, tangible, machine-readable media (e.g., server memory 130 of FIG. 1 operating as a non-transitory computer readable medium) that when run by one or more processors (e.g., the server processor 122 of FIG. 1) may cause the one or more processors to perform operations described in operations 302-322.

FIG. 3 illustrates an example flowchart of the process 300 to generate the optimized SAS configuration commands 128, in accordance with one or more embodiments. In one or more embodiments, the process 300 comprises implementing the one or more existing SAS configuration commands 136 to route and assign spectra of certain communication channels 202 to one or more connected devices (e.g., one of the base stations 160 or the one or more user equipment 110). In performing one or more SAS operations (e.g., routing operations and spectra assigning operations), multiple channel parameters 142 are determined from the communication channels 202 during the SAS operations. In some embodiments, the channel parameters 142 are dynamically stored in the data lakes 140. At this stage, the machine learning algorithm 144 is executed to monitor, analyze, and structure the channel parameters 142 in the data lake 140. In this regard, the channel optimization controller 126 may be configured to generate the optimized SAS configuration commands 128 based at least in part upon outputs from the machine learning algorithm 144. In some embodiments, the communication channels 202 may be CBRS channels. In other embodiments, a SAS administrator may monitor activity on one, some, or all the CBRS channels to obtain the channel parameters 142. The optimized SAS configuration commands 128 may enable the server 102 to dynamically modify some of the channels 202 that are affected by interference (e.g., low quality of service and performance) by automatically moving CBRS channels to the best frequency available in a given area.

The process 300 starts at operation 302, where the server 102 performs SAS operations in the communication system 100 (e.g., as part of a communication network) in accordance with the existing SAS configuration commands 136. At operation 304, the server 102 collects the channel parameters 142 from the one or more communication channels 202. In some embodiments, the channel parameters 142 are collected from the communication channels 202 over a predefined (e.g., preconfigured or configured) time duration. In other embodiments, the channel parameters 142 are collected from the communication channels 202 continuously or periodically over the predefined time duration. In yet other embodiments, the server 102 may store the one or more channel parameters 142 in the data lake 140 automatically in response to collecting the one or more channel parameters 142 from the communication channels 202 over the predefined time duration. At operation 306, the server 102 stores the channel parameters 142 in one or more data lakes 140. At operation 308, the server 102 monitor the channel parameters 142 based at least in part upon execution of the machine learning algorithm 144. The machine learning algorithm 144 may organize and analyze the information stored in the data lakes 140. At operation 310, the server 102 may manage routing and assignment of resources for the channels 202 following the SAS operations. At operation 312, the server 102 may generate optimized SAS configuration commands 128 based on the analysis performed by executing the machine learning algorithm 144. In this regard, the machine learning algorithm 144 may output the one or more artificial intelligence commands 136 to implement the optimized SAS configuration commands 128.

The process 300 continues at operation 320, where the server 102 may determine whether the optimized SAS configuration commands 128 are different from the existing SAS configuration commands 136. In this regard, the server 102 may compare the optimized SAS configuration commands 128 to the existing SAS configuration commands 136. If the server 102 determines that the optimized SAS configuration commands 128 comprise commands that are not different (e.g., same commands) to those comprised in the plurality of existing SAS configuration commands (i.e., NO), the process 300 returns to operation 302. In this case, at operation 302, the server 102 performs new SAS operations in the communication system 100 using the existing SAS configuration commands 136. In response, if the server 102 determines that the optimized SAS configuration commands 128 comprise commands that are different to those comprised in the existing SAS configuration commands 136 (i.e., YES), the process 300 proceeds to operation 322. In this case, the process 300 may conclude at operation 322, where the server 102 performs new SAS operations in the communication system 100 using the optimized SAS configuration commands 128.

Scope Of The Disclosure

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112 (f) as it exists on the date of filing hereof unless the words "means for" or "step for" are explicitly used in the particular claim.

The invention claimed is:

1. A method, comprising:
performing a first plurality of spectrum administration service (SAS) operations in accordance with existing SAS configuration commands during a first time duration, wherein:
the first plurality of SAS operations is configured to establish one or more communication sessions between a plurality of network components in a core network and a plurality of user equipment;
the existing SAS configuration commands are configured to provide control information to perform a first plurality of SAS operations;
the first plurality of SAS operations is associated with controlling access between the plurality of user equipment and one or more Citizens Broadband Radio Service (CBRS) channels; and
the one or more CBRS channels are communication channels configured to provide connectivity between the plurality of user equipment and the core network;
collecting a plurality of channel parameters, the plurality of channel parameters comprising unstructured data associated with the first plurality of SAS operations and the one or more CBRS channels;
storing the plurality of channel parameters in a data lake comprising the plurality of channel parameters;
transforming, using a machine learning algorithm, the unstructured data of the plurality of channel parameters into structured data in the data lake, the structured data being representative of a plurality of conditions in the one or more CBRS channels during the first time duration;
generating, using the machine learning algorithm, a plurality of routing modifications based at least in part upon the plurality of channel parameters and the existing SAS configuration commands, the routing modifications being configured to modify routing of resources in the plurality of CBRS channels to be allocated in a communication network;
generating, using the machine learning algorithm, a plurality of optimized SAS configuration commands based at least in part upon the plurality of routing modifications, the existing SAS configuration commands, a transformed version of the unstructured data representative of a plurality of conditions in the one or more CBRS channels during the first time duration, the optimized SAS configuration commands comprising possible updates to the plurality of existing SAS configuration commands, and the routing modifications;
comparing, using the machine learning algorithm, the plurality of optimized SAS configuration commands to the plurality of existing SAS configuration commands;
determining, using the machine learning algorithm, that the plurality of optimized SAS configuration commands comprise one or more commands that are different to those comprised in the plurality of existing SAS configuration commands; and
in response to determining that the plurality of optimized SAS configuration commands comprise commands that are different to those comprised in the plurality of existing SAS configuration commands, training the machine learning algorithm using input data comprising the structured data representative of the plurality of conditions in the one or more CBRS channels during the first time duration, and the routing modifications; and
performing a second plurality of SAS operations associated with the one or more CBRS channel in accordance with the optimized SAS configuration commands during a second time duration, the second time duration being different from the first time duration.

2. The method of claim 1, further comprising:
in response to determining that the plurality of optimized SAS configuration commands comprise same commands to those comprised in the plurality of existing SAS configuration commands, performing the second plurality of SAS operations in accordance with the existing SAS configuration commands.

3. The method of claim 1, wherein:
the plurality of channel parameters from the plurality of communication channels is collected over a predefined time duration during the first time duration.

4. The method of claim 3, wherein:
the plurality of channel parameters is stored in the data lake automatically in response to collecting the plurality of channel parameters over the predefined time duration.

5. The method of claim 1, wherein:
the plurality of channel parameters comprises a channel connectivity registry comprising connectivity interruptions and connectivity success rates, dynamic routing information, static routing information, a plurality of channel communication frequency bands.

6. The method of claim 5, wherein:
the connectivity interruptions comprise communication interruptions in the one or more CBRS channels over a predefined time duration during the first time duration.

7. The method of claim 5, wherein:
the connectivity success rates comprise a percentage of successful communication transactions in the one or more CBRS channels over a predefined time duration.

8. A non-transitory computer readable medium storing instructions that when executed by a processor cause the processor to:
perform a first plurality of spectrum administration service (SAS) operations in accordance with existing SAS configuration commands during a first time duration, wherein:
the first plurality of SAS operations is configured to establish one or more communication sessions between a plurality of network components in a core network and a plurality of user equipment;
the existing SAS configuration commands are configured to provide control information to perform a first plurality of SAS operation;
the first plurality of SAS operations is associated with controlling access between the plurality of user equipment and one or more Citizen Broadband Radio Service (CBRS) channels; and
the one or more CBRS channels are communication channels configured to provide connectivity between the plurality of user equipment and the core network;
collect a plurality of channel parameters, the plurality of channel parameters comprising unstructured data associated with the first plurality of SAS operations and the one or more CBRS channels;
store the plurality of channel parameters in a data lake comprising the plurality of channel parameters;
transform, using a machine learning algorithm, the unstructured data of the plurality of channel parameters into structured data in the data lake, the structured data being representative of a plurality of conditions in the one or more CBRS channels during the first time duration;
generate, using the machine learning algorithm, a plurality of routing modifications based at least in part upon the plurality of channel parameters and the existing SAS configuration commands, the routing modifications being configured to modify routing of resources in the plurality of CBRS channels to be allocated in a communication network;
generate, using the machine learning algorithm, a plurality of optimized SAS configuration commands based at least in part upon the plurality of routing modifications, the existing SAS configuration commands, a transformed version of the unstructured data representative of a plurality of conditions in the one or more CBRS channels during the first time duration, the optimized SAS configuration commands comprising possible updates to the plurality of existing SAS configuration commands, and the routing modifications;
compare, using the machine learning algorithm, the plurality of optimized SAS configuration commands to the plurality of existing SAS configuration commands;

determine, using the machine learning algorithm, the plurality of optimized SAS configuration commands to the plurality of existing SAS configuration commands; and
in response to determining that the plurality of optimized SAS configuration commands comprise commands that are different to those comprised in the plurality of existing SAS configuration commands, training the machine learning algorithm using input data comprising the structured data representative of the plurality of conditions in the one or more CBRS channels during the first time duration, and the routing modifications; and
perform a second plurality of SAS operations associated with the one or more CBRS channel in accordance with the optimized SAS configuration commands during a second time duration, the second time duration being different from the first time duration.

9. The non-transitory computer readable medium of claim 8, wherein the processor is further caused to:
in response to determining that the plurality of optimized SAS configuration commands comprise same commands to those comprised in the plurality of existing SAS configuration commands, performing the second plurality of SAS operations in accordance with the existing SAS configuration commands.

10. The non-transitory computer readable medium of claim 8, wherein:
the plurality of channel parameters from the plurality of communication channels is collected over a predefined time duration during the first time duration.

11. The non-transitory computer readable medium of claim 10, wherein:
the plurality of channel parameters is stored in the data lake automatically in response to collecting the plurality of channel parameters over the predefined time duration.

12. The non-transitory computer readable medium of claim 8, wherein:
the plurality of channel parameters comprises a channel connectivity registry comprising connectivity interruptions and connectivity success rates, dynamic routing information, static routing information, a plurality of channel communication frequency bands.

13. The non-transitory computer readable medium of claim 12, wherein:
the connectivity interruptions comprise communication interruptions in the one or more CBRS channels over a predefined time duration during the first time duration; and
the connectivity success rates comprise a percentage of successful communication transactions in the one or more CBRS channels over the predefined time duration.

14. An apparatus, comprising:
a memory, comprising:
a data lake comprising one or more channel parameters that are stored as structured data, semi-structured data, or unstructured data;
a machine learning algorithm configured to analyze and structure the one or more channel parameters in the data lake; and
a plurality of existing spectrum administration service (SAS) configuration commands configured to establish one or more communication sessions between a plurality of network components in a core network and a plurality of user equipment, the existing SAS configuration commands being configured to provide control information to perform a first plurality of SAS operation; and a processor communicatively coupled to the memory and configured to:

perform the first plurality of SAS operations in accordance with the existing SAS configuration commands during a first time duration, wherein:

the first plurality of SAS operations is associated with controlling access between the plurality of user equipment and one or more Citizens Broadband Radio Service (CBRS) channels; and the one or more CBRS channels are communication channels configured to provide connectivity between the plurality of user equipment and the core network;

collect a plurality of channel parameters, the plurality of channel parameters comprising unstructured data associated with the first plurality of SAS operations and the one or more CBRS channels;

store the plurality of channel parameters in the data lake;

transform, using the machine learning algorithm, the unstructured data of the plurality of channel parameters into structured data in the data lake, the structured data being representative of a plurality of conditions in the one or more CBRS channels during the first time duration;

generate, using the machine learning algorithm, a plurality of routing modifications based at least in part upon the plurality of channel parameters and the existing SAS configuration commands, the routing modifications being configured to modify routing of resources in the plurality of CBRS channels to be allocated in a communication network;

generate, using the machine learning algorithm, a plurality of optimized SAS configuration commands based at least in part upon the plurality of routing modifications, the existing SAS configuration commands, a transformed version of the unstructured data representative of a plurality of conditions in the one or more CBRS channels during the first time duration, the optimized SAS configuration commands comprising possible updates to the plurality of existing SAS configuration commands, and the routing modifications;

compare, using the machine learning algorithm, the plurality of optimized SAS configuration commands to the plurality of existing SAS configuration commands;

determine, using the machine learning algorithm, that the plurality of optimized SAS configuration commands comprise one or more commands that are different to those comprised in the plurality of existing SAS configuration commands; and in response to determining that the plurality of optimized SAS configuration commands comprise commands that are different to those comprised in the plurality of existing SAS configuration commands, train the machine learning algorithm using input data comprising the structured data representative of the plurality of conditions in the one or more CBRS channels during the first time duration, and the routing modifications; and perform a second plurality of SAS operations associated with the one or more CBRS channels in accordance with the optimized SAS configuration commands during a second time duration, the second time duration being different from the first time duration.

15. The apparatus of claim 14, wherein the processor is further configured to:

in response to determining that the plurality of optimized SAS configuration commands comprise same commands to those comprised in the plurality of existing SAS configuration commands, perform the second plurality of SAS operations in accordance with the existing SAS configuration commands.

16. The apparatus of claim 14, wherein:

the plurality of channel parameters from the plurality of communication channels is collected over a predefined time duration during the first time duration.

17. The apparatus of claim 16, wherein:

the processor is further configured to store the one or more channel parameters in the data lake automatically in response to collecting the one or more channel parameters from the plurality of communication channels over the predefined time duration.

18. The apparatus of claim 14, wherein:

the one or more channel parameters comprise a channel connectivity registry comprising connectivity interruptions and connectivity success rates, dynamic routing information, static routing information, a plurality of channel communication frequency bands.

19. The apparatus of claim 18, wherein:

the connectivity interruptions comprise communication interruptions in the one or more CBRS channels over a predefined time duration during the first time duration.

20. The apparatus of claim 18, wherein:

the connectivity success rates comprise a percentage of successful communication transactions in the one or more CBRS channels over a predefined time duration.

* * * * *